(No Model.)

J. HILL.
BELT FASTENER.

No. 578,991. Patented Mar. 16, 1897.

WITNESSES:
Edward Thorpe
J. Fred. Acker

INVENTOR
J. Hill
BY
[signature]
ATTORNEYS.

THE NORRIS PETERS CO., PHOTO-LITHO., WASHINGTON, D. C.

UNITED STATES PATENT OFFICE.

JONATHAN HILL, OF JERSEY CITY, NEW JERSEY.

BELT-FASTENER.

SPECIFICATION forming part of Letters Patent No. 578,991, dated March 16, 1897.

Application filed December 10, 1896. Serial No. 615,084. (No model.)

*To all whom it may concern:*

Be it known that I, JONATHAN HILL, of Jersey City, in the county of Hudson and State of New Jersey, have invented a new and Improved Belt-Fastener, of which the following is a full, clear, and exact description.

The object of my invention is to provide a fastener for driving-belts so constructed that it may be expeditiously and conveniently applied to or disconnected from a belt, and which when applied will hold the belt so connected at its ends that the belt will readily travel over a pulley without unduly injuring the fastener, the belt at the point of application to the fastener being as strong as at any other portion of the belt.

Another object of the invention is to construct the belt-fastener in a simple, durable, and economic manner, and so that the engaging ends of the belt will be held closely and firmly together.

The invention consists in the novel construction and combination of the several parts, as will be hereinafter fully set forth, and pointed out in the claims.

Reference is to be had to the accompanying drawings, forming a portion of this specification, in which similar characters of reference indicate corresponding parts in all the figures.

Figure 1:
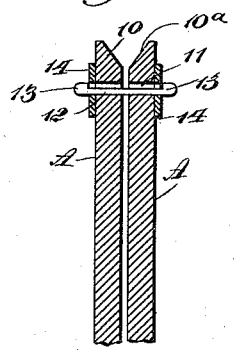
Figure 2:
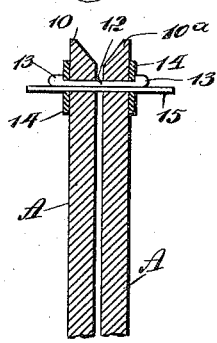
Figure 3:
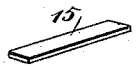
Figure 4:
Figure 5:
Figure 6:
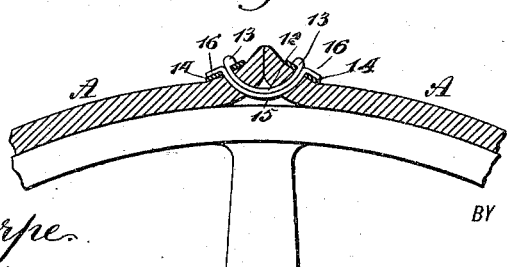

Figure 1 is a longitudinal section through the extremities of the belt, the extremities being brought in parallel order, and the said Fig. 1 further illustrates the application of a locking-bar to the extremities of the belt. Fig. 2 is a view similar to Fig. 1, except that a key is passed through the extremities of the belt, bringing the locking-bar up into locking position. Fig. 3 is a detail perspective view of the key. Fig. 4 is a detail perspective view of the locking-bar. Fig. 5 is a detail perspective view of one of the washers used in connection with the fastener; and Fig. 6 is a longitudinal section through a portion of a belt, illustrating the application of the fastener thereto, the belt being shown in position upon a pulley.

The ends of the belt A are beveled, and the beveled surfaces 10 and 10ª of the belt are brought together when the fastening device is applied to the belt. Near the beveled ends of the belt openings 11 are made in transverse arrangement, and a locking-bar 12 is passed through opposing or corresponding openings when the end portions of the belt are brought in parallel arrangement, as shown in Figs. 1 and 2. Each locking-bar 12 is provided at each end with a head 13, the head being made to extend above the upper surface of the locking-bar, the bottom or lower face of the said bar being uninterrupted. The length of the locking-bar is such that the heads will extend beyond the outer side faces of the belt and receive washers 14, which are passed over the heads of the locking-bar, as also shown in Figs. 1 and 2. The openings 11 in the belt are of greater transverse dimensions than the cross-section of the locking-bar which is passed through them. Therefore the locking-bar may be forced upward or outward, and this is accomplished through the medium of a key 15, which key, as shown in Fig. 3, consists of a flat strip of metal of greater length than the length of the locking-bar in connection with which it is to be used.

The key is passed through the washers 14 beneath and in engagement with the locking-bar, forcing the locking-bar outward, so that its heads will engage with the outer faces of the washers 14 at a point above the openings in the washers, as illustrated in Fig. 2. After the locking-bar and key have been placed in position, as above described, the ends of the key are bent downward and inward, so that they will lie close upon the washers 14 below the heads of the locking-bar, as shown in Fig. 6.

A belt fastened as above described when passed over a pulley assumes the position shown in Fig. 6, and when the belt is passed over the pulley both the locking-bars and the keys will be given a curved form, being concaved upon their upper and convexed upon their lower faces, and the outer bent portions of the keys are designated by the reference-numeral 16.

Having thus described my invention, I claim as new and desire to secure by Letters Patent—

1. A belt-fastener, consisting of a locking-bar terminating in heads which extend beyond one of the side faces of the bar, washers adapted to be passed over the heads of the locking-bar, and a key adapted to be passed through the washers and in engagement with the straight side face of the locking-bar, as and for the purpose specified.

2. The combination, with the ends of a belt, the said end portions of the belt being provided with alining openings, of locking-bars passed through registering openings in the belt, the said locking-bars terminating in heads at their ends and the heads extending beyond the outer side faces of the locking-bars, the inner side faces being substantially straight, washers passed over the heads of the locking-bars to an engagement with the belt, and keys passed through the washers to an engagement with the under or straight surfaces of the locking-bars, the ends of the said keys being bent upon the said washers, as and for the purpose specified.

3. The combination with a belt having its ends beveled and provided with registering openings at its end portions, of a locking-bar passed through registering openings, the said locking-bars extending beyond the outer faces of the belt, terminating in heads at their extremities, which extend beyond the plane of the upper side faces of the locking-bars, the bottom of the locking-bars being substantially straight, washers passed over the ends of the locking-bars to a position between the heads and the outer sides of the belt, and keys passed through the washers and through registering openings in the belt to an engagement with the under or straight surfaces of the locking-bars, the extremities of the keys being forced to an engagement with the washers, as and for the purpose set forth.

JONATHAN HILL.

Witnesses:
SAMUEL C. MEGINNIS,
ABEL S. R. JONES.